United States Patent
Yang et al.

(10) Patent No.: US 9,930,631 B2
(45) Date of Patent: Mar. 27, 2018

(54) SYNCHRONIZATION SIGNAL DESIGN FOR DEVICE TO DEVICE OPERATION

(71) Applicant: Nokia Solutions and Networks Oy, Espoo (FI)

(72) Inventors: Weidong Yang, San Diego, CA (US); Zexian Li, Espoo (FI); Lars Lindh, Helsingfors (FI)

(73) Assignee: Nokia Solutions and Networks Oy, Espoo (FI)

( * ) Notice: Subject to any disclaimer, the term of this patent is extended or adjusted under 35 U.S.C. 154(b) by 129 days.

(21) Appl. No.: 15/033,962

(22) PCT Filed: Nov. 7, 2014

(86) PCT No.: PCT/EP2014/074095
§ 371 (c)(1),
(2) Date: May 3, 2016

(87) PCT Pub. No.: WO2015/067778
PCT Pub. Date: May 14, 2015

(65) Prior Publication Data
US 2016/0286507 A1    Sep. 29, 2016

Related U.S. Application Data

(60) Provisional application No. 61/901,694, filed on Nov. 8, 2013.

(51) Int. Cl.
*H04W 4/00* (2018.01)
*H04B 7/216* (2006.01)
(Continued)

(52) U.S. Cl.
CPC ......... *H04W 56/002* (2013.01); *H04W 8/005* (2013.01); *H04W 76/023* (2013.01); *H04W 76/14* (2018.02)

(58) Field of Classification Search
CPC .... H04W 56/00; H04W 72/042; H04L 5/0041
See application file for complete search history.

(56) References Cited

U.S. PATENT DOCUMENTS

| 9,414,337 B2* | 8/2016 | Kim | H04W 56/0015 |
| 2013/0083779 A1* | 4/2013 | Ahn | H04W 72/04 370/336 |

(Continued)

FOREIGN PATENT DOCUMENTS

WO    2011/121374 A1    10/2011

OTHER PUBLICATIONS

International Search Report and Written Opinion received for corresponding Patent Cooperation Treaty Application No. PCT/EP2014/074095, dated Jan. 22, 2015, 10 pages.

(Continued)

*Primary Examiner* — Melanie Jagannathan
(74) *Attorney, Agent, or Firm* — Nokia Technologies OY

(57) ABSTRACT

Various communication systems may benefit from appropriate synchronization signal design. For example, third generation partnership project (3GPP) long term evolution advanced (LTE-A) releases 12 and 13 (Rel 12/13) may benefit from such design for device to device (D2D) communications. In particular, synchronization signals may be designed to benefit proximity services (ProSe)/D2D discovery and communication. A method can include transmitting a cellular synchronization signal on a first resource. The method can also include transmitting a device to device synchronization signal on a second resource. The first resource can be different from the second resource. The cellular synchronization signal and the device to device synchronization signal can share a same base sequence.

18 Claims, 3 Drawing Sheets

(51) Int. Cl.
*H04J 3/06*     (2006.01)
*H04W 56/00*    (2009.01)
*H04W 8/00*     (2009.01)
*H04W 76/02*    (2009.01)

(56) References Cited

U.S. PATENT DOCUMENTS

| | | | | |
|---|---|---|---|---|
| 2014/0153448 A1* | 6/2014 | Ribeiro | ............ | H04L 5/14 |
| | | | | 370/280 |
| 2014/0321314 A1* | 10/2014 | Fodor | ............ | H04W 72/085 |
| | | | | 370/252 |
| 2015/0245192 A1* | 8/2015 | Wu | ............ | H04W 8/005 |
| | | | | 370/329 |
| 2016/0270014 A1* | 9/2016 | Wang | ............ | H04W 56/00 |
| 2017/0006563 A1* | 1/2017 | Lindoff | ............ | H04W 56/001 |
| 2017/0078991 A1* | 3/2017 | Chae | ............ | H04W 48/20 |

OTHER PUBLICATIONS

Huawei et al., "Design Considerations for D2DSS" 3GPP Draft; R1-135532, 3rd Generation Partnership Project (3GPP), Mobile Competence Centre; 650, Route Des Lucioles; F-06921; vol. Ran WG1, No. San Francisco, USA Nov. 11, 2013-Nov. 15, 2013; Nov. 1, 2013; XP050750701.

General Dynamics Broadband UK; "ProSe device to device broadcast physical channels"; 3GPP Draft R1-134271 D2D Broadcast Physical Channels GDBUK; 3rd Generation Partnership Project; Mobile Competence Centre; 650; Route Des Lucioles; F-06921; vol. Ran WG1, No. Guangzhou; Oct. 7, 2013-Oct. 11, 2013; Sep. 27, 2013; XP050717151.

* cited by examiner

SYNCHRONIZATION SIGNAL DESIGN FOR DEVICE TO DEVICE OPERATION

RELATED APPLICATION

This application was originally filed as Patent Cooperation Treaty Application No. PCT/EP2014/074095 filed Nov. 7, 2014 which claims priority benefit to U.S. Provisional Patent Application No. 61/901,694, filed Nov. 8, 2013.

BACKGROUND

Field

Various communication systems may benefit from appropriate synchronization signal design. For example, third generation partnership project (3GPP) long term evolution advanced (LTE-A) releases 12 and 13 (Rel 12/13) may benefit from such design for device to device (D2D) communications. In particular, synchronization signals may be designed to benefit proximity services (ProSe)/D2D discovery and communication.

Description of the Related Art

One aspect of D2D operation is D2D synchronization. D2D operation may be synchronous for discovery and communication. In case of out of network (NW) coverage, user equipment (UE) based synchronization can be adopted. In case of within NW coverage, the UE can derive transmission (TX) timing based on the downlink (DL) timing and timing advance (TA), if available.

Synchronization sources, which may comprise eNB, D2D UEs, D2D cluster heads or other type of node transmitting some beacons, may transmit at least a D2D synchronization signal (D2DSS). The D2D synchronization signal may be used for time and frequency synchronization in D2D communication. This D2D synchronization signal may be used by D2D UEs at least to derive or determine time and/or frequency related information for D2D synchronization. For example, the D2D UEs may utilize the D2D synchronization signal for symbol timing acquisition, carrier frequency synchronization, and sampling clock synchronization in D2D communication. The D2D synchronization signal allows the D2D UEs to complete time and frequency synchronization and to acquire useful system parameters such as D2D device identity and/or access mode (FDD/TDD). This D2D synchronization signal may also carry the identity and/or type of the synchronization source(s). The D2D synchronization signal can include a primary D2DSS (PD2DSS), which can use a Zadoff-Chu (ZC) sequence. The D2D synchronization signal can also include a secondary D2DSS (SD2DSS), which can use a maximum length (M) sequence. The PD2DSS and SD2DSS can include, for example, an ID for a cluster head, which also could be used for scrambling of the D2D communication channel related to the cluster head (CH). The PD2DSS and the SD2DSS form part of the layer 1 device identification ID, which may be used to separate reference symbols and the content of associated channels among neighboring devices. The PD2DSS and the SD2DSS are located in different radio resources within radio frames. The PD2DSS may be used by D2D UEs to acquire or determine the slot boundary timing, for example. The PD2DSS signal or sequence may be the same for any given cell in every subframe in which it is transmitted. The SD2DSS signal or sequence may be used by D2D UEs to determine the position of the radio frame boundary.

A D2D UE searches the PD2DSS for a quick check on the presence of a D2D synchronization source. And SD2DSS may carry more extended information for D2D discovery and/or communication. A successfully detected PD2DSS and/or SD2DSS can also provide a timing and frequency reference for the D2D UE. Cellular primary synchronization signal (PSS)/secondary synchronization signal (SSS) can be used for time and frequency synchronization for communication between UEs and corresponding eNBs in a cellular network and are cell-specific reference signal. The cellular primary synchronization signal (PSS)/secondary synchronization signal (SSS), as defined in the current LTE specification, for example, may be reused for D2D synchronization. However, if the cellular PSS/SSS is reused for D2D synchronization, a UE searching for a LTE network and/or D2D transmissions may be unable to determine if the detected synchronization signal is cellular PSS/SSS or D2D PSS/SSS. In other words, the UE may not identify whether the detected PSS/SSS is coming from a D2D synchronization source for D2D communication or from an evolved Node B (eNB) for cellular communication.

If frequency division duplex (FDD) is utilized in the cellular network, the PSS/SSS from eNB may be transmitted on a DL carrier frequency while the PSS/SSS from D2D UE may be transmitted on an uplink (UL) carrier frequency assuming that D2D communication is operated or performed over UL carrier frequency. Based on the detected frequency, the UE can determine whether the PSS/SSS is for D2D synchronization or for cellular synchronization. By contrast, in case of time division duplex (TDD) operation, the same sequence may be used for both regular cellular communication and D2D operation. Thus, the receiving UE may not know whether the detected PSS/SSS is coming from an eNB for cellular communication or D2D synchronization resources for D2D communication without further checking with the transmitter of the detected PSS/SSS. The problem exists as well in FDD system if D2D is operated or performed over DL carrier frequency. And the embodiments described in the following apply to FDD case as well.

SUMMARY

According to a first embodiment, a method can include transmitting a cellular synchronization signal on a first resource. The method can also include transmitting a device to device synchronization signal on a second resource. The first resource can be different from the second resource. The cellular synchronization signal and the device to device synchronization signal can share a same base sequence.

In a variant, the cellular synchronization signal and the device to device synchronization signal are orthogonal or quasi-orthogonal to one another.

In a variant, a primary synchronization sequence of the cellular synchronization can use a same resource as a secondary synchronization sequence of the device to device synchronization signal.

In a variant, a secondary synchronization sequence of the cellular synchronization can use a same resource as a primary synchronization sequence of the device to device synchronization signal.

In a variant, the device to device synchronization signal can include a synchronization sequence designed as $$ZC_M^{63}(n) = e^{-j\frac{\pi M n(n+1)}{63}}, n = 0, 1, \ldots, 62$$

where M can be different comparing to cellular PSS/SSS, for example M=38, and n is the frequency index.

In a further variant, M is a number co-prime to an M value used for LTE cellular communication.

In a variant, the device to device synchronization signal can include a synchronization sequence designed as $$ZC_M^{63}(n) = e^{-j\frac{\pi M(n(n+1)+nP)}{63}}, n = 0, 1, \ldots, 62$$

where M can be different comparing to cellular PSS/SSS, for example M=38, and n is the frequency index; and where P is used to introduce a phase ramp.

In a further variant, P can be 62.

According to a second embodiment, a method can include receiving a cellular synchronization signal on a first resource. The method can also include receiving a device to device synchronization signal on a second resource. The first resource can be different from the second resource. The cellular synchronization signal and the device to device synchronization signal can share a same base sequence.

In a variant, the cellular synchronization signal and the device to device synchronization signal can be orthogonal to one another.

The second embodiment can have all the same variants as the first embodiment.

According to third and fourth embodiments, an apparatus can include at least one processor and at least one memory including computer program code. The at least one memory and the computer program code can be configured to, with the at least one processor, cause the apparatus at least to perform the method according to the first and second embodiments, respectively, in any of their variants.

According to fifth and sixth embodiments, an apparatus can include means for performing the method according to the first and second embodiments, respectively, in any of their variants.

According to seventh and eighth embodiments, a non-transitory computer-readable medium can be encoded with instructions that, when executed in hardware, perform the method according to the first and second embodiments, respectively, in any of their variants.

According to ninth and tenth embodiments, a computer program produce can include instructions for performing the method according to the first and second embodiments, respectively.

According to eleventh and twelfth embodiments, a system can include the apparatuses of the third and fourth embodiments and the fifth and sixth embodiments, respectively, in any of their variants.

BRIEF DESCRIPTION OF THE DRAWINGS

For proper understanding of the invention, reference should be made to the accompanying drawings, wherein.

DETAILED DESCRIPTION

Figure 1:
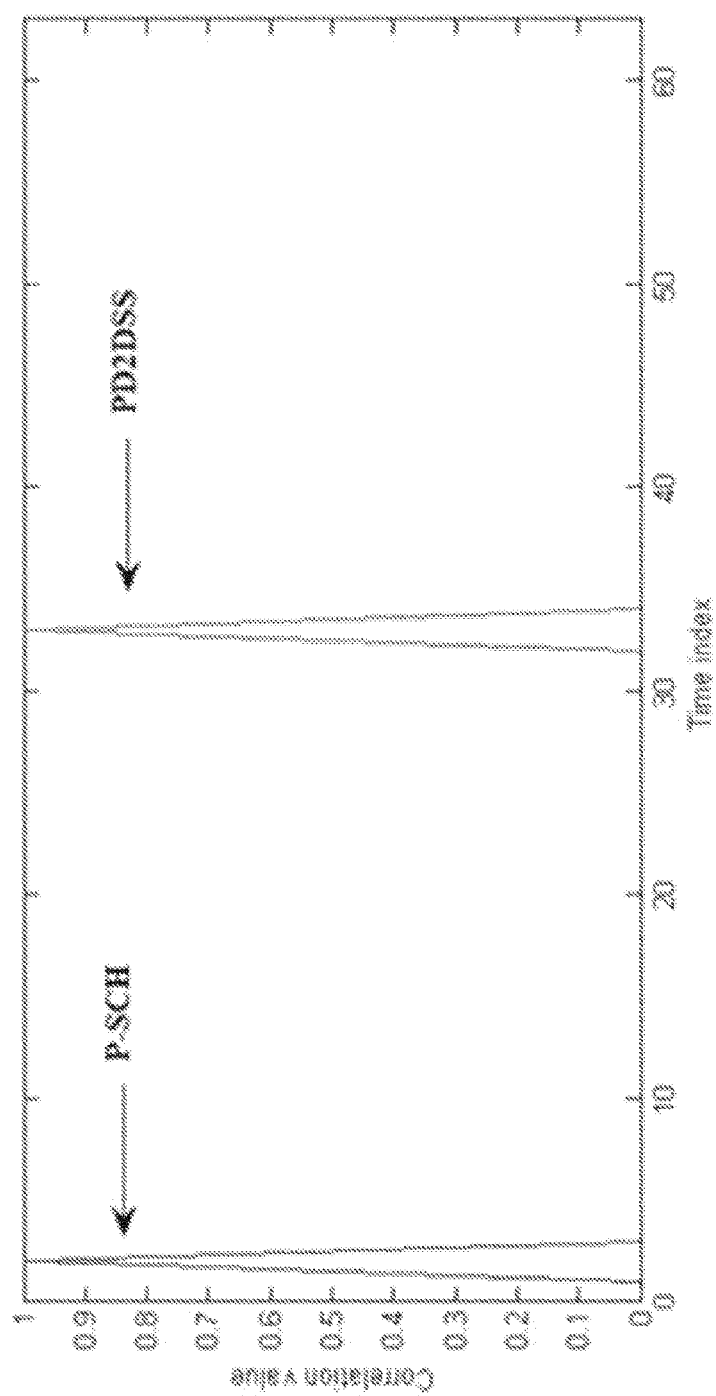
FIG. 1 illustrates a phase ramp to differentiate P-SCH and PD2DSS.

Certain embodiments provide various ways to identify D2D UE and eNB in TDD via the received synchronization (sync) signals. Specifically, in TDD, D2D sync sequences for D2D communication and sync sequences transmitted by the eNB for cellular communication can be derived from a same base sequence. In some instances, the eNB can also transmit a D2D sync signal.

A base sequence may be pseudorandom codes or pseudonoise sequences, a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence), for example. Various operation such as cyclic shifts and sign-flip operations may be applied to a base sequence so as to generate sync sequences. Moreover, the D2D sync sequences for D2D communication and the sync sequences used by the eNB for cellular communication may be orthogonal to each other. It may also be possible that the D2D sync sequences are quasi-orthogonal to the sync sequences used by the eNB for cellular communication if their cross correlation is low. The low cross correlation between the D2D sync sequences and the sync sequences used by the eNB for cellular communication is useful. For example, a UE that is not involved in a D2D synchronization procedure may not be misled by the D2D sync sequences transmitted by corresponding D2D synchronization sources. Meantime, a D2D UE may not be confused by the sync sequences from eNB(s) for cellular communication. In another example, an eNB may transmit D2D sync sequences used for D2D communication and its own sync sequences (i.e. P-SCH and S-SCH) for cellular communication concurrently on the same time and/or frequency resources. In another example, a UE, which may operate simultaneously or concurrently as a regular UE for cellular communication and as a D2D UE for D2D communication, can use the same single receiver to detect and/or track the D2D sync sequences of D2D communication and the sync sequences from eNB of cellular communication due to use the low cross correlation afore mentioned. In addition, the following options or designs can be used alone or in any combination with one another for D2D sync sequences.

According to a first option, D2D UE and eNB can use different sync sequences derived from the same base sequence for D2D communication and cellular communication, respectively. Thus, different sync sequences can be utilized for D2D synchronization although following the same design principle as current specified PSS/SSS used by eNB for cellular communication.

According to a second option, a D2D UE and eNB can use a same sync sequence for D2D communication and cellular communication, but the sync sequence may be transmitted on different resources in time, frequency, space domain, and/or code domain, for example. Thus, a different predefined resource, as specified, cellular PSS/SSS can be transmitted in the central PRBs. PD2DSS/SD2DSS can be transmitted in other frequency part, for example at the edge of the frequency band. Potentially, certain embodiments can use different frequency offset with respect to the frequency raster. As for the initial cell search, a UE can search all the carrier frequencies allowed in a frequency band. The center frequency for PD2DSS/SD2DSS can be offset by a difference with respect to the center frequency of a conventional LTE system, for example, 6 tones so the tones taken by a regular P-SCH/S-SCH do not fully overlap with those taken by PD2DSS/SD2DSS. The frequency offset may not be an integer multiple of a specific frequency value such as, for example, 100 KHz, which is the channel raster (Section 5.7.2. "Channel raster" of 3GPP TS 36.104 "Base Station (BS) radio transmission and reception," which is hereby incorporated herein by reference in its entirety). As in the cell search procedure of a conventional LTE system, frequencies derived from downlink EARFCNs can be searched by a conventional UE (i.e., for cellular communication); an offset of multiple of the specific frequency value such as 100 KHz can fail to differentiate the PD2DSS/SD2DSS from cellular PSS/SSS.

It is also possible for D2D transmissions, the PSS/SSS time and frequency locations for the conventional FDD LTE system may be used for PD2DSS/SD2DSS. The signal design for cellular PSS/SSS can be also reused for PD2DSS/SD2DSS. With this specific solution in the second option, in a FDD UL frequency, the UE knows every detected PSS/SSS must be from a D2D synchronization source. In a TDD band, the UE also knows the detected PSS/SSS pair which follows the conventional FDD LTE system's sync design including time and frequency locations must be from a D2D transmission. As some frequency can be categorized as a FDD band in one region and TDD band in another region, there may be an issue if a D2D UE operating at a specific frequency contradicting assignment of regions for the FDD and TDD bands.

According to a third option, a D2D synchronization source for D2D communication and eNB for cellular communication may use the same sync sequence but transmit using different transmission periodicities. For example, a different periodicity can be defined for D2DSS transmission. In this case, if D2DSS is transmitted with different transmission periods, the receiving D2D UE can make the judgment based on the detected transmission periodicity.

According to a fourth option, a D2D UE and eNB can use the same sync sequence but the D2D UE can indicate, via broadcasting, for example, that the transmitter is a D2D UE. Thus, for example, in addition to synchronization signal, the D2D synchronization source UE can broadcast the information indicating that the transmitter is a D2D UE. This information can be transmitted in a similar way as system information or embedded in, for example, a D2D discovery message part.

According to a fifth option, the positions for PSS and SSS can be switched, such that PD2DSS is transmitted in the same resources as SSS and SD2DSS is transmitted in the same resources as PSS.

According to a sixth option, the peak-to-average power ratio (PAPR) may be used as a design criterion for selecting D2D synchronization sequences. A so-called "cubic metric" is also used to quantize the swing of a signal instead of PAPR in 3GPP. As the PD2DSS is derived from the ZC sequence, its PAPR is low. Considering the data channel for D2D is through SC-FDMA (i.e. DFT spreading OFDMA), its PAPR is also low. However, the PAPR of SD2DSS may be high if the design of interleaved m-sequences is used without further restriction. To lower the PAPR of SD2DSS, it may be possible to search for different m-sequences for example through using different generation polynomials and initial seeds, only sequences with low PAPR are allowed for SD2DSS. Alternatively, instead of using interleaved m-sequences for SD2DSS, one or more ZC sequence can be used. For example, two ZC sequences, each of them spanning one OFDM symbol, can be used to signify two indices separately. And those two indices are mapped to an index for SD2DSS.

As mentioned above, any combination of the above alternatives can be made. Also, the above alternatives can be further modified and combined with additional alternatives.

PD2DSS can be designed in a variety of ways. For example, the three PSS sequences for LTE in the frequency domain can be given by $$S_M(n) = ZC_M^{63}(n) = e^{-j\frac{\pi Mn(n+1)}{63}}, n = 0, 1, \ldots, 30, 32, \ldots, 62$$

where M=29,34,25 is the root index of the ZC sequence, and n is the frequency index.

Because 29+34=63, the receiver design can exploit the conjugate relationship between $S_{29}$ and $S_{34}$.

With respect to SC-FDMA waveform generation, if the LTE P-SCH is reused for PD2DSS, then the only difference may be that the DC tone is not skipped in the PD2DSS. This similarity may lead to confusion at the UE receiver side, as it may not know whether the detected signal is from an eNB or cluster head. Additionally, if lots of D2D devices transmit the PD2DSS, then non-D2D UEs' cell search may get confused.

Depending on the number of clusters required in one area, the design for PD2DSS can be provided in at least two ways:

According to a first design, one PD2DSS sequence may be used. In this case, one choice is to use 63−25=38, so the PD2DSS in the frequency domain may be given by $$ZC_M^{63}(n) = e^{-j\frac{\pi Mn(n+1)}{63}}, n = 0, 1, \ldots, 62$$

where the root index M is a different value comparing to the values used for PSS, for example M=38, and n is the frequency index.

In the PRACH design, cyclic shift can be used to differentiate the PRACH preambles. A similar idea can, in a second design, be used in the PD2DSS design. For example, when the symbol duration is 66.67 μs, a cyclic shift of 66.67/2 μs can create three PD2DSS sequences. The three PD2DSS sequences in the frequency domain can be given by $$ZC_M^{63}(n) = e^{-j\frac{\pi M(n(n+1)+nP)}{63}}, n = 0, 1, \ldots, 62$$

where M=38 is the root index of the ZC sequence, and n is the frequency index; and where P is used to introduce a phase ramp. For example, 62 can be used for P, so the correlation peak can be at maximum separation with respect to that for LTE P-SCH. The value of 62 for P is just an example. Other values less than or greater than 62 are also permitted. For example, any value from 1 to 62 is permitted, but values greater than 62 are also permitted.

Moreover, the second design and the first design can be combined. For example, M can be allowed to take an additional value other than 38.

According to a third design, the design can be like the first design, except that a value of M is used, such that M is a number co-prime to any M values that are used for LTE cellular communication (29, 34 or 25). This selection may avoid any systematic interactions between the sequences.

FIG. 1 illustrates a phase ramp to differentiate P-SCH and PD2DSS. As shown in FIG. 1, a phase ramp can permit correlation peaks of PD2DSS and P-SCH with a function $$e^{-j\frac{\pi Mn(n+1)}{63}}, n = 0, 1, \ldots, 30, 32, \ldots, 62$$

to be at a maximum separation in the time domain. The correlation result between P-SCH and the function $$e^{-j\frac{\pi M n(n+1)}{63}}, n = 0, 1, \ldots, 30, 32, \ldots, 62$$

is shown on the left side of the figure, and the correlation result between PD2DSS and the function $$e^{-j\frac{\pi M n(n+1)}{63}}, n = 0, 1, \ldots, 30, 32, \ldots, 62$$

is shown on the right side.

A secondary synchronization signal can also be designed. For example, various designs of SD2DSS are possible. The secondary sync signal in LTE may be basically given by $(m_0, m_1)$, where $m_1 - m_0 = 1,2,3,4,5,6$, $0 \leq m_1, m_0 \leq 30$. Additionally, $(m_0, m_1) = \{(0,7), (1,8), (2,9)\}$ may be included, so that in total 168 combinations can be generated.

According to a first design a similar design principle can be followed so that more combinations are generated. For example, $(m_0, m_1)$ can be permitted with $m_1 - m_0 = 8, 9, 10, \ldots$, $0 \leq m_1, m_0 \leq 30$.

According to a second design, a phase ramp as introduced in the second design for PD2DSS can also be used for SD2DSS. In this way, the same receiver chain for S-SCH can be used. The phase ramp, corresponding to a timing shift in the time domain, can be used to differentiate S-SCH and SD2DSS.

Certain embodiments may have various benefits or advantages. For example, certain embodiments may provide a non-complex and efficient method to avoid UE confusion after detecting PSS/SSS.

Figure 2:
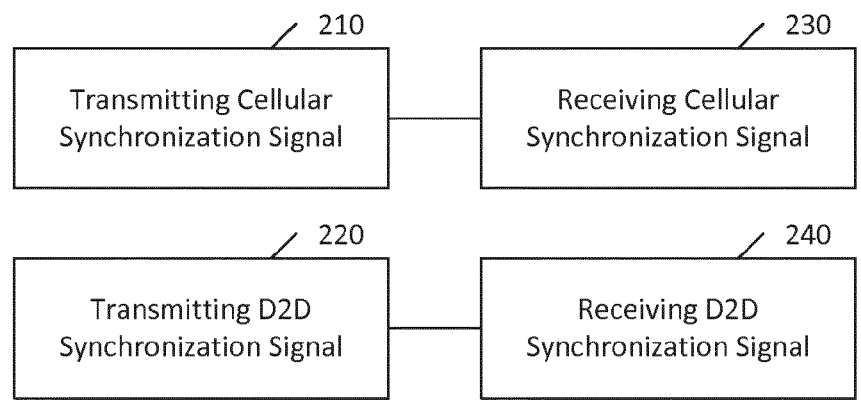
FIG. 2 illustrates a method according to certain embodiments.

FIG. 2 illustrates a method according to certain embodiments. As shown in FIG. 2, a method can include, at 210, transmitting a cellular synchronization signal on a first resource. The method can also include, at 220, transmitting a device to device synchronization signal on a second resource. The first resource can be different from the second resource. The cellular synchronization signal and the device to device synchronization signal can share a same base sequence. A base sequence may be pseudorandom codes or pseudonoise sequences, a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence), for example. Various operation such as cyclic shifts and sign-flip operations may be applied to a base sequence so as to generate synchronization sequences. The cellular synchronization signal and the device to device synchronization signal or sequence can be orthogonal or quasi-orthogonal to one another.

Radio resources supported by a cellular network such as LTE may be simultaneously used by cellular as well as D2D links. In this regard, the radio resources assigned in a cellular network such as LTE to a primary synchronization sequence of the cellular synchronization and a secondary synchronization sequence of the cellular synchronization may be used or shared by a primary synchronization sequence of the device to device synchronization signal and a secondary synchronization sequence of the device to device synchronization signal. Various options may be possible. For example, a primary synchronization sequence of the cellular synchronization can use a same resource as a secondary synchronization sequence of the device to device synchronization signal. Likewise, a secondary synchronization sequence of the cellular synchronization can use a same resource as a primary synchronization sequence of the device to device synchronization signal.

The device to device synchronization signal can include a synchronization sequence designed as $$ZC_M^{63}(n) = e^{-j\frac{\pi M n(n+1)}{63}}, n = 0, 1, \ldots, 62$$

where M takes different values comparing to cellular PSS, for example M=38 as the root index of the ZC sequence, and n is the frequency index.

Additionally, in certain cases, M can be a number co-prime to an M value used for LTE cellular communication.

In another option, the device to device synchronization signal can include a synchronization sequence designed as $$ZC_M^{63}(n) = e^{-j\frac{\pi M (n(n+1)+nP)}{63}}, n = 0, 1, \ldots, 62$$

where M=38 is the root index of the ZC sequence, and n is the frequency index; and where P is used to introduce a phase ramp. P can, for example, be 62. In this regard, the ZC sequence is masked with a phase ramp, then the detection of the device to device synchronization signal can be handled in the time domain. The same receiver chain for P-SCH can be used for device to device synchronization signal. The phase ramp, corresponding to a timing shift in the time domain, can be used to differentiate P-SCH and device to device synchronization signal.

The method can further include, at 230, receiving the cellular synchronization signal on the first resource. The method can additionally include, at 240, receiving a device to device synchronization signal on a second resource. The first resource and the second resource may be same or different.

Although the value of 38 and/or the value of a number co-prime to M values defined for LTE cellular communication are illustrated above for the design of the device to device synchronization signal, the invention is not so limited. In this regard, any other values lead the resulting synchronization signals indicating associated communication type, D2D or cellular without departing from the spirit and scope of the various embodiments of the invention.

Figure 3:
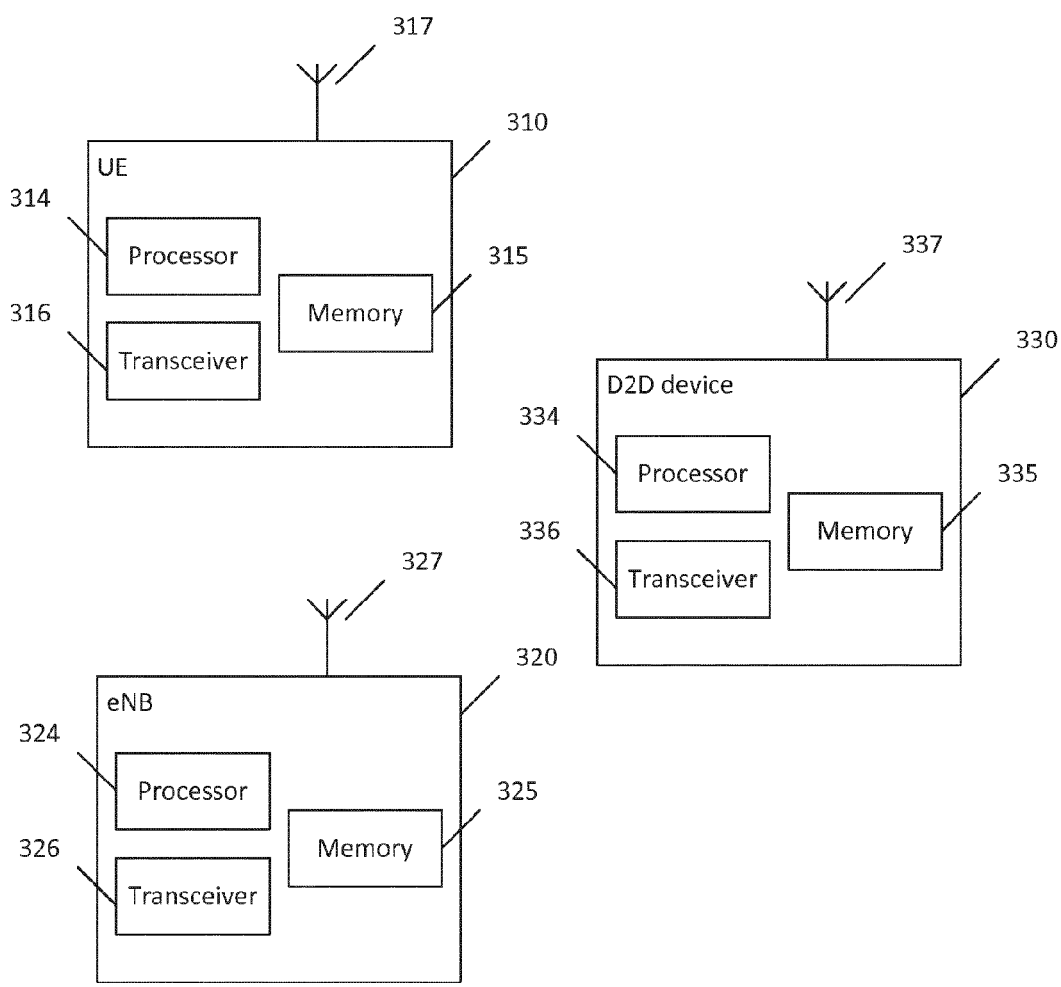
FIG. 3 illustrates a system according to certain embodiments.

FIG. 3 illustrates a system according to certain embodiments of the invention. In one embodiment, a system may include multiple devices, such as, for example, at least one UE 310, at least one eNB 320 or other base station or access point, and at least one D2D device 330. In certain systems, UE 310, eNB 320, D2D device 330, and a plurality of other user equipment may be present. Other configurations are also possible. The UE 310 may be equipped for both cellular and D2D communication. In other word, the UE 310 may operate in a cellular mode for cellular communication, and in a D2D mode for D2D communication.

Each of these devices may include at least one processor, respectively indicated as 314, 324, and 334. At least one memory can be provided in each device, as indicated at 315, 325, and 335, respectively. The memory may include computer program instructions or computer code contained therein. The processors 314, 324, and 334 and memories 315, 325, and 335, or a subset thereof, can be configured to provide means corresponding to the various blocks of FIG. 2. Although not shown, the devices may also include positioning hardware, such as global positioning system (GPS) or micro electrical mechanical system (MEMS) hardware, which can be used to determine a location of the device. Other sensors are also permitted and can be included to determine location, elevation, orientation, and so forth, such as barometers, compasses, and the like.

As shown in FIG. 3, transceivers 316, 326, and 336 can be provided, and each device may also include at least one antenna, respectively illustrated as 317, 327, and 337. The device may have many antennas, such as an array of antennas configured for multiple input multiple output (MIMO) communications, or multiple antennas for multiple radio access technologies. Other configurations of these devices, for example, may be provided. For example, eNB 320 and D2D device 330 may additionally be configured for wired communication, and in such a case antenna 337 would also illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 310, eNB 320, and D2D device 330, to perform any of the processes described above (see, for example, FIG. 2). Therefore, in certain embodiments, a non-transitory computer-readable medium can be encoded with computer instructions that, when executed in hardware, perform a process such as one of the processes described herein. Alternatively, certain embodiments can be performed entirely in hardware.

Furthermore, although FIG. 3 illustrates a system including a UE, eNB, and D2D device, embodiments of the invention may be applicable to other configurations, and configurations involving additional elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Glossary

3GPP Third Generation Partnership Project
D2D Device to Device
D2DSS D2D synchronization signal
DL Downlink
EARFCN E-UTRA Absolute Radio Frequency Channel Number
eNB evolved Node B
E-UTRA Evolved UTRA
FDD Frequency Division Duplex
LTE-A Long Term Evolution Advanced
M Maximum Length
NW Network
PAPR Peak-to-Average Power Ratio
PRACH Physical Random Access Channel
PD2DSS primary D2D synchronization signal
ProSe Proximity Services
PSS Primary Synchronization Signal
Rel Release
SD2DSS secondary D2D synchronization signal
SSS Secondary Synchronization Signal
TDD Time Division Duplex
TX Transmission
UE User Equipment
UL Uplink
ZC Zadoff-Chu

We claim:

1. A method, comprising:
receiving a cellular synchronization signal on a first resource; and
receiving a device to device synchronization signal on a second resource,
wherein the first resource is different from the second resource,
wherein the cellular synchronization signal and the device to device synchronization signal share a same base sequence, and
wherein the device to device synchronization signal comprises a synchronization sequence designed as $$ZC_M^{63}(n) = e^{-j\frac{\pi M n(n+1)}{63}}, n = 0, 1, \ldots, 30, 32, \ldots, 62$$

where M is a variable different from a corresponding variable used in cellular primary synchronization sequence and n is a frequency index.

2. The method of claim 1, wherein the cellular synchronization signal and the device to device synchronization signal are orthogonal or quasi-orthogonal to one another.

3. The method of claim 1, wherein a primary synchronization sequence of the cellular synchronization uses a same resource as a secondary synchronization sequence of the device to device synchronization signal.

4. The method of claim 1, wherein a secondary synchronization sequence of the cellular synchronization uses a same resource as a primary synchronization sequence of the device to device synchronization signal.

5. The method of claim 1, wherein M is a number co-prime to an M value used for LTE cellular communication.

6. The method of claim 1, wherein M is 38.

7. The method of claim 1, wherein the device to device synchronization signal comprises a synchronization sequence designed as $$ZC_M^{63}(n) = e^{-j\frac{\pi M (n(n+1)+nP)}{63}}, n = 0, 1, \ldots, 30, 32, \ldots, 62$$

where M is a variable different from a corresponding variable used in cellular primary synchronization sequence and n is the frequency index; and where P is used to introduce a phase ramp.

8. The method of claim 7, wherein P is less than or equal to 62.

9. An apparatus, comprising:
at least one processor; and
at least one memory including computer program code,
wherein the at least one memory and the computer program code are configured to, with the at least one processor, cause the apparatus at least to
receive a cellular synchronization signal on a first resource; and
receive a device to device synchronization signal on a second resource,
wherein the first resource is different from the second resource,
wherein the cellular synchronization signal and the device to device synchronization signal share a same base sequence, and
wherein the device to device synchronization signal comprises a synchronization sequence designed as $$ZC_M^{63}(n) = e^{-j\frac{\pi Mn(n+1)}{63}}, n = 0, 1, \ldots, 30, 32, \ldots, 62$$

where M is a variable different from a corresponding variable used in cellular primary synchronization sequence and n is a frequency index.

10. The apparatus of claim 9, wherein the cellular synchronization signal and the device to device synchronization signal are orthogonal or quasi-orthogonal to one another.

11. The apparatus of claim 9, wherein a primary synchronization sequence of the cellular synchronization uses a same resource as a secondary synchronization sequence of the device to device synchronization signal.

12. The apparatus of claim 9, wherein a secondary synchronization sequence of the cellular synchronization uses a same resource as a primary synchronization sequence of the device to device synchronization signal.

13. The apparatus of claim 9, wherein M is a number co-prime to an M value used for LTE cellular communication.

14. The apparatus of claim 9, wherein M is 38.

15. The apparatus of claim 9, wherein the device to device synchronization signal comprises a synchronization sequence designed as $$ZC_M^{63}(n) = e^{-j\frac{\pi M(n(n+1)+nP)}{63}}, n = 0, 1, \ldots, 30, 32, \ldots, 62$$

where M is a variable different from a corresponding variable used in cellular primary synchronization sequence and n is the frequency index; and where P is used to introduce a phase ramp.

16. The apparatus of claim 15, wherein P is less than or equal to 62.

17. The apparatus of claim 15, wherein M is 38.

18. A non-transitory computer-readable medium encoded with instructions that, when executed in hardware, perform a method comprising:
receiving a cellular synchronization signal on a first resource; and
receiving a device to device synchronization signal on a second resource,
wherein the first resource is different from the second resource,
wherein the cellular synchronization signal and the device to device synchronization signal share a same base sequence, and
wherein the device to device synchronization signal comprises a synchronization sequence designed as $$ZC_M^{63}(n) = e^{-j\frac{\pi Mn(n+1)}{63}}, n = 0, 1, \ldots, 30, 32, \ldots, 62$$

where M is a variable different from a corresponding variable used in cellular primary synchronization sequence and n is a frequency index.

* * * * *